United States Patent Office 3,536,667
Patented Oct. 27, 1970

3,536,667
PROCESS OF PREPARING POLYETHYLENE TEREPHTHALATE USING GLYCERYL ANTIMONITE AS POLYCONDENSATION CATALYST
Mary J. Stewart, Media, and John A. Price, Swarthmore, Pa., assignors FMC Corporation, Philadelphia, Pa., a corporation of Delaware
No Drawing. Filed June 27, 1968, Ser. No. 740,466
Int. Cl. C08g 17/015
U.S. Cl. 260—75                              4 Claims

ABSTRACT OF THE DISCLOSURE

A process of preparing a filament- or film-forming, thermoplastic polyester resin wherein bis-2-hydroxyethyl terephthalate or a low molecular weight polymer thereof is polycondensed in the presence of a glyceryl antimonite catalyst, is disclosed herein.

---

Polyethylene terephthalate may be prepared, for example, by first reacting ethylene glycol with dimethyl terephthalate. The product of the reaction is generally described as comprising bis-2-hydroxyethyl terephthalate or a low molecular weight polymer thereof. These low molecular weight polymers may also be prepared by other methods, including, for example, the so-called direct esterification reaction between ethylene glycol and terephthalic acid.

Heretofore, various materials have been suggested as polycondensation catalysts for polycondensing the bis-2-hydroxyethyl terephthalate or its low molecular weight polymer to provide high molecular weight resins useful for the preparation of filaments or films. It is desirable that such polycondensation catalysts not only act to form high molecular weight resins, but produce said resins with good color, low carboxyl contents, and high melting points.

From a commercial standpoint, it is essential that the polyester resin be produced in the shortest possible time and with the desired physical properties. A polyethylene terephthalate resin suitable for melt spinning should have substantially little color, a carboxyl content value of no more than about 50 equivalents per million grams (e.q./$10^6$ gr. or meq./kg.), a birefringent melting point of at least about 255° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultra-violet light stability, and a high degree of tenacity.

It is an object of the present invention to provide a method of preparing highly polymeric, thermoplastic, linear polyesters by the polycondensation of bis-2-hydroxyethyl terephthalate or low molecular weight polymers thereof in the presence of a novel and efficient polycondensation catalyst.

This and other objects are accomplished in accordance with this invention, which involves a method for preparing a filament- or film-forming, thermoplastic polyester resin comprising polycondensing bis-2-hydroxyethyl terephthalate or low molecular weight polymers thereof in the presence of a catalytic amount of glyceryl antimonite.

Glyceryl antimoniate has the following structural formula:

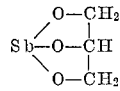

It should be understood that the method of preparing the bis-2-hydroxyethyl terephthalate or low molecular weight polymer thereof is not critical with respect to the present invention. However, as is the general practice, it is preferred that the bis-ester or low molecular weight product be obtained by ester-interchange between dimethyl terephthalate and ethylene glycol at a glycol to terephthalate ratio of from about 1:1 to about 15:1, preferably from about 1.2:1 to about 2.6:1. Such transesterification reactions are generally carried out at atmospheric pressure in an inert atmosphere, such as nitrogen, initially at a temperature range of from about 125° C. to about 250° C., but preferably between about 150° C. and 200° C., in the presence of a transesterification catalyst. During the first stage of this reaction, methanol is evolved and is continuously removed by distillation. After a reaction period of about 1–2 hours, the temperature of the reaction mixture is raised to from about 200° C. to about 300° C. for approximately 1–3 hours in order to complete the reaction and form the desired bis-ester or prepolymer thereof.

Any known suitable transesterification catalyst, for example, lithium hydride or zinc acetate, can be used to catalyze the above reaction. Generally, the transesterification catalyst is used in concentrations of from about 0.01 to about 0.2%, based on the weight of the dimethyl terephthalate used in the initial reaction mixture.

Another preferred method for the preparation of the bis-ester or low molecular weight polymer thereof is a direct esterification reaction between terephthalic acid and ethylene glycol at a glycol to acid ratio of from about 1:1 to about 15:1, preferably from about 1.2:1 to about 2.6:1. The direct esterification step is generally carried out at temperatures ranging from about 180° C. to about 280° C. in the absence of an oxygen-containing atmosphere at atmospheric or elevated pressure for about 1 to 4 hours to form the desired low molecular weight product. For example, the reaction may be carried out in an atmosphere of nitrogen.

Any known suitable first stage direct esterification additive may be used in this method. For example, calcium acetate or triethylamine may be employed. The first stage additives are generally used in concentrations ranging from about $5 \times 10^{-5}$ mole to about $5 \times 10^{-1}$ mole of additive per mole of terephthalic acid in the initial reaction mixture.

The polycondensation step of the present invention is accomplished by heating the first stage product under reduced pressure within the range of from about 0.05 mm. to 20 mm. of mercury while being agitated at a temperature of from about 260° C. to about 325° C. for from about 2 to 4 hours. In accordance with the present invention, glyceryl antimonite is generally employed in amounts ranging from about 0.01% to about 0.2%, based on the weight of the product to be polycondensed. Usually, it has been found that from about 0.02 to about 0.1%, by weight, of the subject polycondensation catalyst is preferred in most instances. While higher or lower concentrations of the catalyst may be employed, lower amounts than stated above are less effective, whereas higher concentrations show little, if any, improvement in the product or in the time of obtaining the product. The polycondensation catalyst is added either before, during or after the first stage reaction and prior to polycondensation.

The following examples are set forth to illustrate the present invention. All parts are by weight, unless otherwise indicated.

EXAMPLE I

A mixture comprising 600 g. of dimethyl terephthalate, 396 mls. of ethylene glycol, and 0.24 g. of lithium hydride was charged into a reaction vessel equipped with a nitrogen inlet, heating means, and stirring means. The reaction mixture was agitated and heated at atmospheric pressure to 197° C. under a nitrogen atmosphere. The reaction mixture was held at the above temperature for about 2 hours during which time about 80% of the methanol byproduct was removed. The temperature of the reaction mixture was then allowed to rise to 230° C. over a period of about 1 hour to distill off the remaining methanol byproduct and a small portion of the excess ethylene glycol, and form a polyester prepolymer. The prepolymer product was allowed to cool under an atmosphere of nitrogen.

EXAMPLE II

Fifty grams of the prepolymer product of Example I was mixed with 0.02 g. of glyceryl antimonite, $C_3H_5SbO_3$, and placed in a reaction vessel. The reaction mixture was heated to about 280° C. under reduced pressure of about 0.1 mm. of mercury while under agitation for about 2 hours to bring about the formation of a high molecular weight polyester resin product. The resin product was cooled under a nitrogen atmosphere. The polyeser resin formed had an intrinsic viscosity of 0.847, a carboxyl content of 11.0 meq./kg., and a melting point of 260–262° C.

EXAMPLE III

A blended mixture comprising 474 g. of terephthalic acid, 288 mls. of ethylene glycol, and 149 mls. of triethylamine was charged into a reaction vessel equipped with a nitrogen inlet, a Dean-Stark separating apparatus, heating means and stirring means. The reaction mixture was agitated and the temperature was raised to about 197° C. under a nitrogen blanket at atmospheric pressure. At about 190° C., a water-triethylamine azeotropic mixture began to distill off. The azeotropic mixture was continuously separated by means of the Dean-Stark apparatus, and the triethylamine recovered was continuously returned to the reaction vessel. The reaction mixture became almost clear and then the temperature was allowed to rise to 230° C. over a one hour period to form the polyester prepolymer. The product was allowed to cool under an atmosphere of nitrogen.

EXAMPLE IV

Fifty grams of the prepolymer product of Example III was mixed with 0.02 g. of glyceryl antimonite, $C_3H_5SbO_3$, and placed in a reaction vessel. The reaction mixture was heated at about 280° C. under reduced pressure of about 0.1 mm. of mercury while under agitation for about 2 hours to bring about the formation of a high molecular weight polyester resin. The resin was cooled under a nitrogen atmosphere. The product was found to have an intrinsic viscosity of 0.773, a carboxyl content of 7 meq./kg., and a melting point of 257–260° C.

The process of the present invention has been described with particular reference to high molecular weight polyethylene terephthalate resin, but it will be obvious that the subject invention includes within its scope other resinous polymethylene terephthalates formed from glycols of the series $HO(CH_2)_nOH$, wherein $n$ is 2 to 10 and terephthalic acid, and copolyesters containing varied amounts of other suitable dicarboxylic acids, such as isophthalic acid. Terephthalate copolymers wherein small amounts (up to about 10 mol percent) of diol or diacid moieties are included in the polymer chain, to improve the properties of the high molecular weight resin, such as dyeability, flame-retardancy, and the like, are, in a like manner, included in the process of this invention. Thus, the low molecular weight polymer of bis-2-hydroxyethyl terephthalate may include small amounts of other polycondensable substances, as is well known in the art.

The results in the above examples indicate that the presence of glyceryl antimonite during the polycondensation of the terephthalate prepolymers accelerates the rate of polycondensation and enhances the properties of the resulting polyester. The polyester resins produced by the present method have high molecular weights, high melting points, and low carboxyl contents, thereby making such resins particularly suitable for the melt spinning of shaped articles, such as filaments or films.

Various changes and modifications can be made practicing the present invention without departing from the spirit and scope thereof, and therefore, it is not to be limited, except as defined in the appended claims.

We claim:

1. A process of preparing a filament- or film-forming thermoplastic polyester resin comprising polycondensing bis-2-hydroxyethyl terephthalate or low molecular weight polymers thereof in the presence of a catalytic amount of glyceryl antimonite as a polycondensation catalyst.

2. The process of claim 1 wherein glyceryl antimonite is present in an amount of from about 0.01 to about 0.2%, based on the weight of the material to be polycondensed.

3. The process of claim 1 wherein the bis-2-hydroxyethyl terephthalate or low molecular weight polymer thereof is first prepared by an ester-interchange reaction in the presence of an ester-interchange catalyst.

4. The process of claim 1 wherein the bis-2-hydroxyethyl terephthalate or low molecular weight polymer thereof is prepared by the direct esterification of terephthalic acid and ethylene glycol in the presence of a direct esterification additive.

References Cited

UNITED STATES PATENTS

| | | | |
|---|---|---|---|
| 2,951,060 | 8/1960 | Billica | 260—75 |
| 3,109,853 | 11/1963 | Worsley et al. | 260—446 |

WILLIAM H. SHORT, Primary Examiner

L. P. QUAST, Assistant Examiner